(12) United States Patent
Tsai

(10) Patent No.: US 9,821,877 B2
(45) Date of Patent: Nov. 21, 2017

(54) PRESSURE-BALANCED SHOCK ABSORBER FOR A BICYCLE

(71) Applicant: Chin-Sung Tsai, New Taipei (TW)

(72) Inventor: Chin-Sung Tsai, New Taipei (TW)

( * ) Notice: Subject to any disclaimer, the term of this patent is extended or adjusted under 35 U.S.C. 154(b) by 0 days.

(21) Appl. No.: 15/138,947

(22) Filed: Apr. 26, 2016

(65) Prior Publication Data

US 2017/0305494 A1 Oct. 26, 2017

(51) Int. Cl.
| | |
|---|---|
| *B62K 21/00* | (2006.01) |
| *B62K 25/08* | (2006.01) |
| *F16F 9/43* | (2006.01) |
| *F16F 9/32* | (2006.01) |
| *F16F 9/02* | (2006.01) |

(52) U.S. Cl.
CPC ............ *B62K 25/08* (2013.01); *F16F 9/0209* (2013.01); *F16F 9/3221* (2013.01); *F16F 9/43* (2013.01); *F16F 2222/126* (2013.01); *F16F 2230/06* (2013.01)

(58) Field of Classification Search
CPC . B62J 1/08; B62K 19/18; B62K 25/08; A47C 3/20; A47C 3/285
USPC .......... 188/285, 289, 319.1, 319.2; 280/275, 280/276; 267/64.12, 120, 300
See application file for complete search history.

(56) References Cited

U.S. PATENT DOCUMENTS

| | | | | |
|---|---|---|---|---|
| 5,727,898 | A * | 3/1998 | Lu ......................... | A45C 13/262 16/113.1 |
| 6,802,407 | B1 * | 10/2004 | Chen ...................... | B62K 25/08 188/282.8 |
| 7,147,207 | B2 * | 12/2006 | Jordan ..................... | F16F 9/461 188/322.22 |
| 7,163,223 | B2 * | 1/2007 | Wesling ................. | B62K 25/08 137/493.4 |
| 7,364,143 | B2 * | 4/2008 | Chen ...................... | B62K 25/08 188/319.2 |
| 7,810,826 | B2 * | 10/2010 | McAndrews .......... | B62K 25/04 280/124.157 |
| 8,342,302 | B2 * | 1/2013 | Mcandrews ............ | F16F 9/096 188/314 |
| 9,056,650 | B2 * | 6/2015 | Gonzalez ............... | B62K 25/08 |
| 2009/0001684 | A1 * | 1/2009 | McAndrews .......... | B62K 25/08 280/276 |
| 2015/0183487 | A1 * | 7/2015 | Tsai ....................... | B62K 25/28 280/284 |

* cited by examiner

*Primary Examiner* — Christopher Schwartz
(74) *Attorney, Agent, or Firm* — Muncy, Geissler, Olds & Lowe, P.C.

(57) ABSTRACT

A pressure-balanced shock absorber has an outer tube, an inflatable base, a piston tube, a valve adjusting rod, a piston base, an inner tube, and an adjusting resilient element. The inflatable base has a valve passage and a first valve core. The first valve core selectively seals the valve passage. The piston tube communicates with the valve passage. The valve adjusting rod is movably mounted in the valve passage of the inflatable base and the valve tube. The piston base is connected to the piston tube and has a piston passage. A second valve core selectively seals the piston passage. The inner tube is mounted around the piston tube. The piston base divides the inner tube into a first air chamber and a second air chamber. The adjusting resilient element is disposed in the piston tube to achieve the effect of inflating two air chambers.

15 Claims, 7 Drawing Sheets

PRESSURE-BALANCED SHOCK ABSORBER FOR A BICYCLE

BACKGROUND OF THE INVENTION

1. Field of the Invention

The present invention is a shock absorber for a bicycle with pressure-balanced function.

2. Description of the Prior Arts

A conventional bicycle includes a shock absorber installed in a front fork or a rear fork of the bicycle. The shock absorber can absorb the shock produced by the bicycle bumping along the road. The conventional shock absorber has a spring and an air chamber. The spring is mounted in the shock absorber and the air chamber is formed in the shock absorber. The combination of the spring and the air chamber is to handle different magnitudes of shock. However, the spring constant is invariant, so the same spring is not suitable for different terrains. If the impact produced from the road does not exceed the spring constant, the spring loses the buffering function. In view of this, a shock absorber having two air chambers is developed, and both of the two air chambers can individually adjust the amount of gas to meet conditions of different roads and terrains and to lower the weight of the shock absorber. However, the two air chambers of the conventional shock absorber need to be separately inflated, and the inflating process is complicated and time-consuming.

To overcome the shortcomings, the present invention provides a pressure-balanced shock absorber for a bicycle to mitigate or obviate the aforementioned problems.

SUMMARY OF THE INVENTION

The main objective of the present invention is to provide a shock absorber to simplify the inflating steps and promote the inflating efficiency.

The pressure-balanced shock absorber comprises an outer tube, an inflatable base, a piston tube, a valve adjusting rod, a piston base, an inner tube, and an adjusting resilient element. The inflatable base is disposed in the outer tube and has a valve passage and a first valve core. The valve passage is formed in the inflatable base. The first valve core is mounted in the inflatable base and selectively seals the valve passage. The piston tube is connected to and communicates with the valve passage and has at least one inflating hole. The at least one inflating hole is formed through the piston tube. The valve adjusting rod is movably mounted in the valve passage of the inflatable base and the valve tube. The piston base is connected to the piston tube and has a piston passage and a second valve core. The piston passage is formed in the piston base and communicates with the piston tube. The second valve core is mounted in the piston base and selectively seals the piston passage. The inner tube is mounted around the piston tube and disposed in the outer tube. The piston base abuts an inner surface of the inner tube to divide an inner space of the inner tube into a first air chamber and a second air chamber. The first air chamber is disposed between the inner tube and the piston tube, and communicates with the at least one inflating hole. The first air chamber communicates with the second air chamber via the piston passage.

When the first valve core of the inflatable base is not pressed, the first valve core and the second valve core respectively seal the valve passage and the piston passage.

When the first valve core is pressed, the first valve core pushes the valve adjusting rod to press the second valve core to make the first valve core unseal the valve passage and to make the second valve core unseal the piston passage, thereby making the valve passage, the first air chamber, and the piston passage communicate with each other.

When the present invention is in use, an inflator is connected to the inflatable base. The first valve core is pushed downward to unseal the valve passage, and a top end of the valve adjusting rod is pushed by the first valve core. A bottom end of the valve adjusting rod pushes the second valve core downward to unseal the piston passage. Gas from the inflator can pass through the valve passage, the first valve core, and the piston tube and fill in the first air chamber, and at the same time the gas passes through the piston passage, the second air chamber and fills in the second chamber. The present invention achieves the effect of inflating the two air chambers at the same time to simplify the inflating steps and promote the inflating efficiency.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
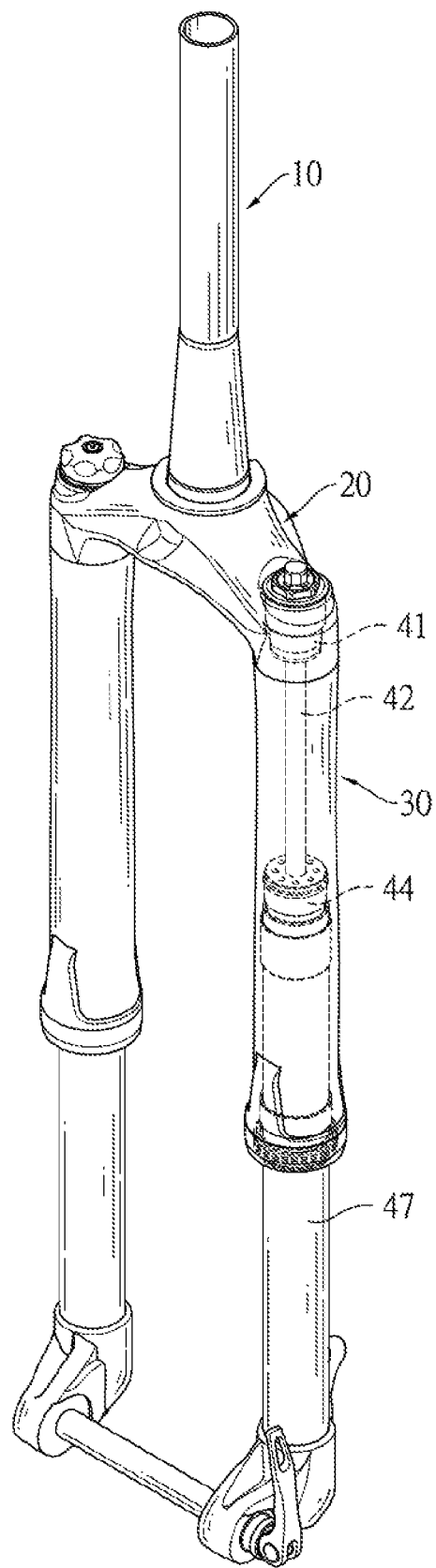
FIG. 1 is a perspective view of a pressure-balanced shock absorber in accordance with the present invention connecting to a fork shoulder cover.
Figure 2:
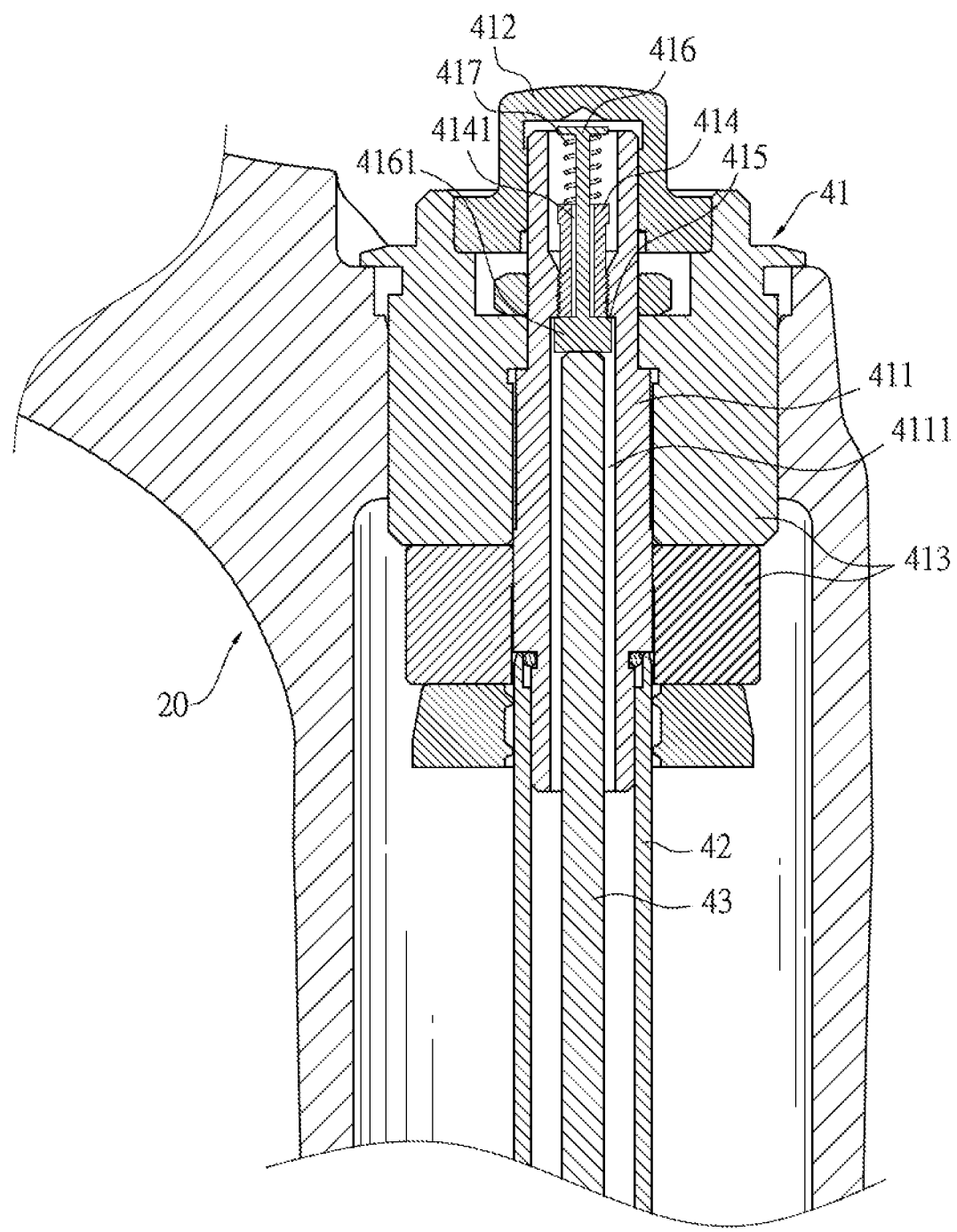
FIG. 2 is a cross-sectional view of the top part of the pressure-balanced shock absorber in FIG. 1.
Figure 3:
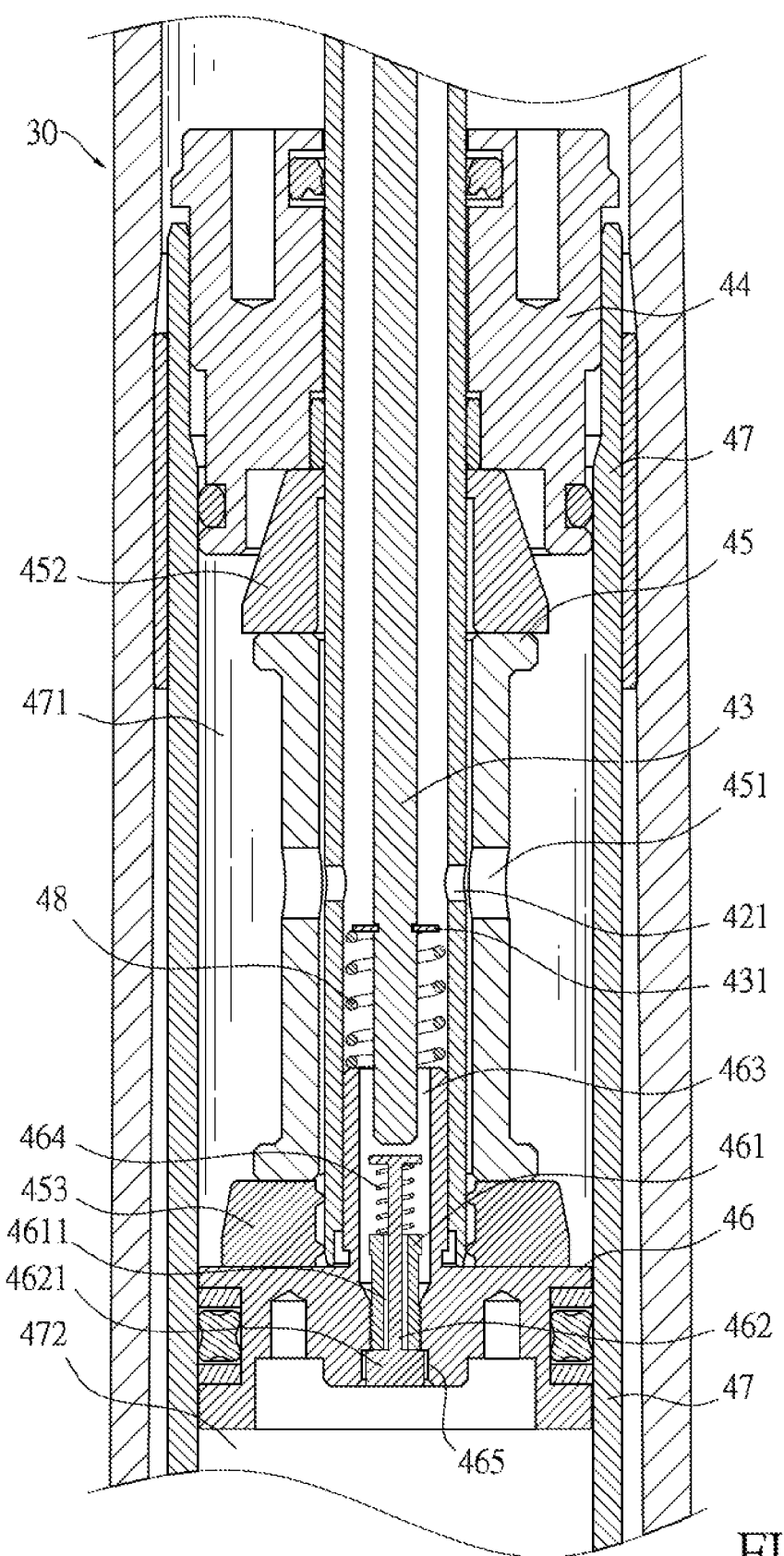
FIG. 3 is a cross-sectional view of the bottom part of the pressure-balanced shock absorber in FIG. 1.
Figure 4:
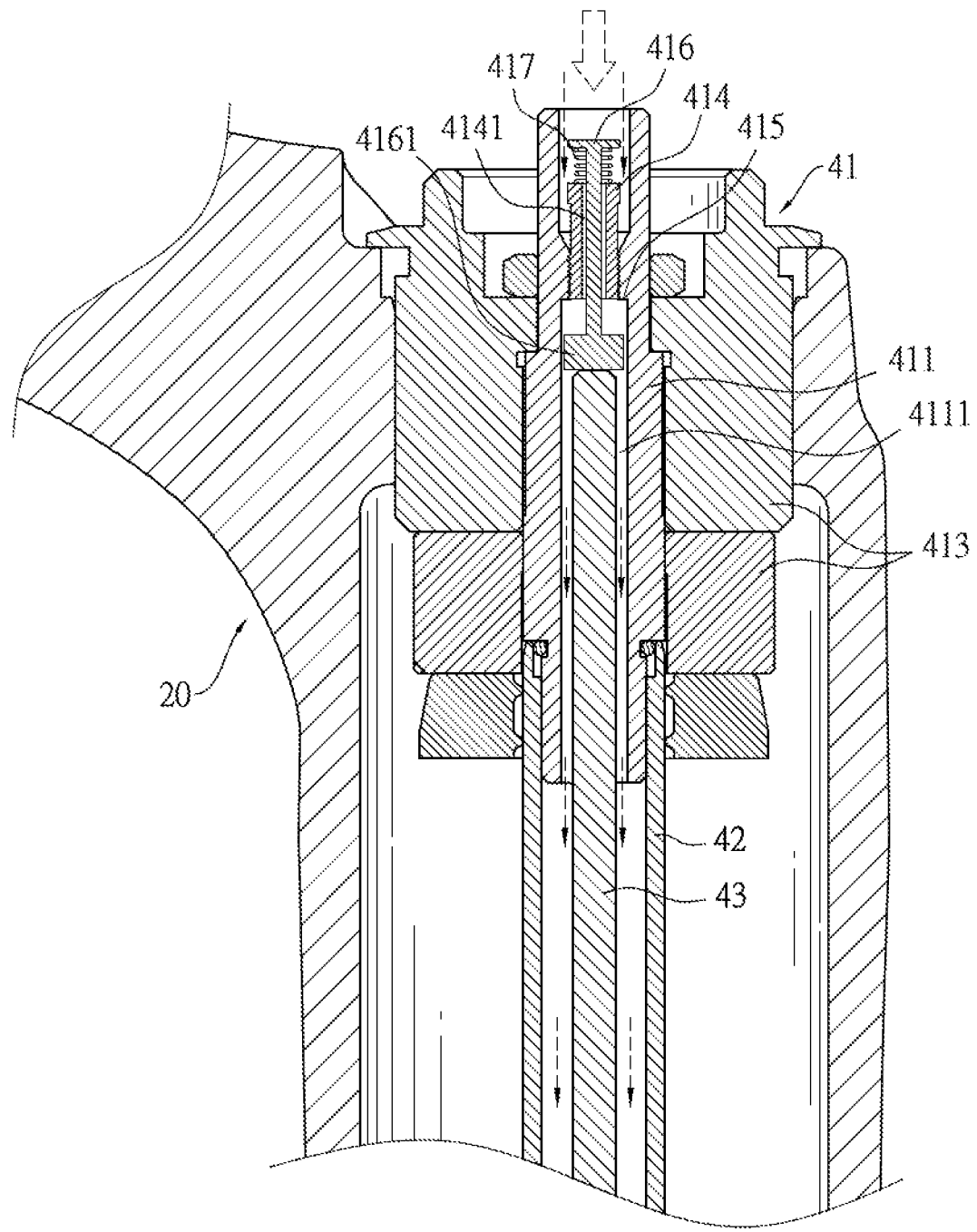
FIG. 4 is a cross-sectional pressing view of a first valve core of the pressure-balanced shock absorber in FIG. 1 in an inflating condition.
Figure 5:
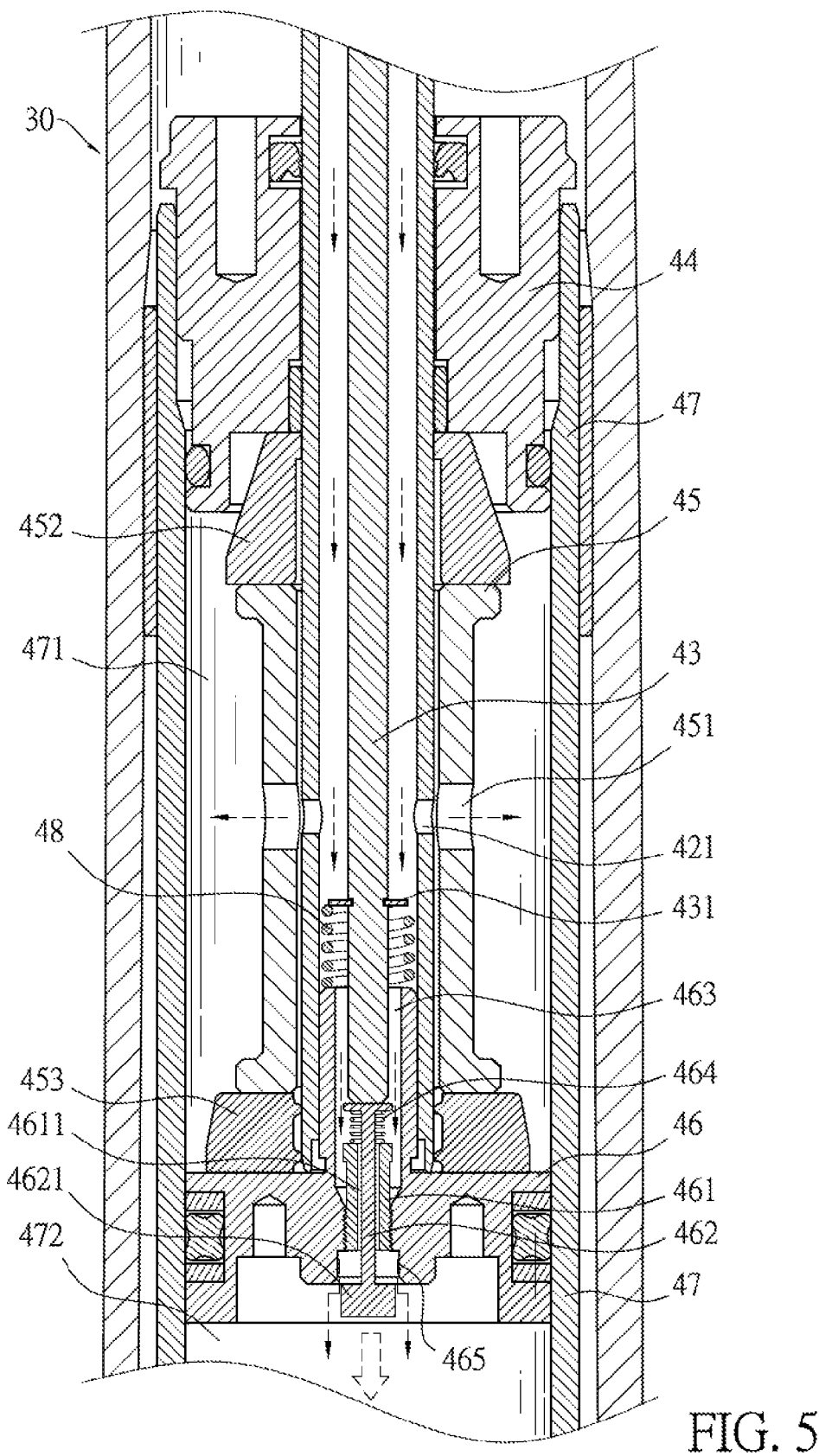
FIG. 5 is a cross-sectional pressing view of a second valve core of the pressure-balanced shock absorber in FIG. 1 in an inflating condition.

With reference to FIGS. 1 to 3, the pressure-balanced shock absorber in accordance with the present invention is mounted in a front fork mechanism (in use, the present invention may be mounted in a front fork mechanism or a rear fork mechanism of a bicycle), the front fork mechanism has a front fork shoulder cover 20 and a steering tube 10, and the steering tube 10 is mounted in a center of the front fork shoulder cover 20. The pressure-balanced shock absorber has an outer tube 30, an inflatable base 41, a piston tube 42, a valve adjusting rod 43, a positioning base 45, a piston base 46, an inner tube 47, an inner base 44, and an adjusting resilient element 48.

The outer tube 30 is connected a bottom surface of the front fork shoulder cover 20.

Figure 6:
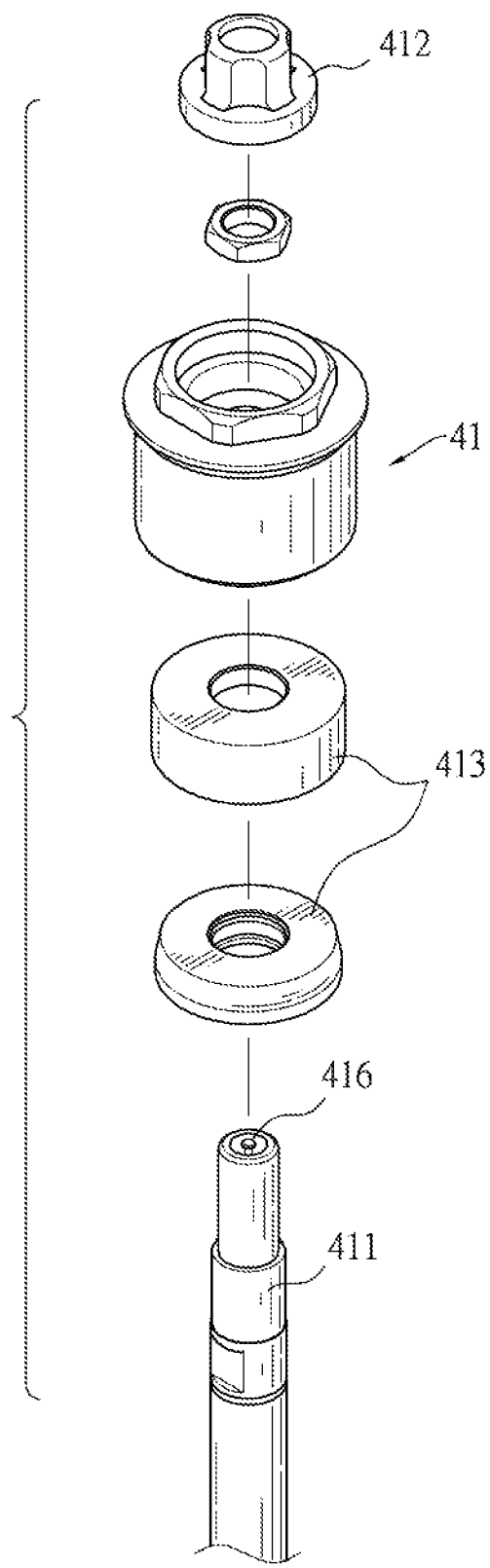
FIG. 6 is an exploded top view of the pressure-balanced shock absorber in FIG. 1.

With reference to FIGS. 1, 2, and 6, the inflatable base 41 is disposed in the front fork shoulder cover 20 and the outer tube 30, and the inflatable base 41 has a valve tube 411, a valve cover 412, multiple cushions 413, and a first valve core. The valve tube 411 is mounted in the inflatable base 41 and has a valve passage 4111, and the valve passage 4111 is formed in the valve tube 411. A first stepped surface 415 is formed and extending in the valve passage 4111. The valve cover 412 is detachably covered on the inflatable base 41. The multiple cushions 413 are mounted around the valve tube 411 and fastened in one end of the front fork shoulder cover 20. The first valve core is mounted in the inflatable base 41 and selectively seals the valve passage 4111 of the valve tube 411.

In the preferred embodiment, the first valve core has a first fixing base 414, a first shift bar 416, and a first resilient element 417. The first fixing base 414 is securely mounted on an inner surface of the valve tube 411 and has a first inflating passage 4141 formed through the first fixing base 414. The first shift bar 416 is movably mounted in the first inflating passage 4141 of the first fixing base 414 and has a first annular flange 4161 formed around and on the first shift bar 416. The first resilient element 417 is mounted around the first shift bar 416 and is disposed between the first shift bar 416 and the first fixing base 414 to push upwards the first shift bar 416, and the first annular flange 4161 abuts the first stepped surface 415 to seal the first inflating passage 4141 of the first fixing base 414 and the valve passage 4111 of the valve tube 411.

Figure 7:
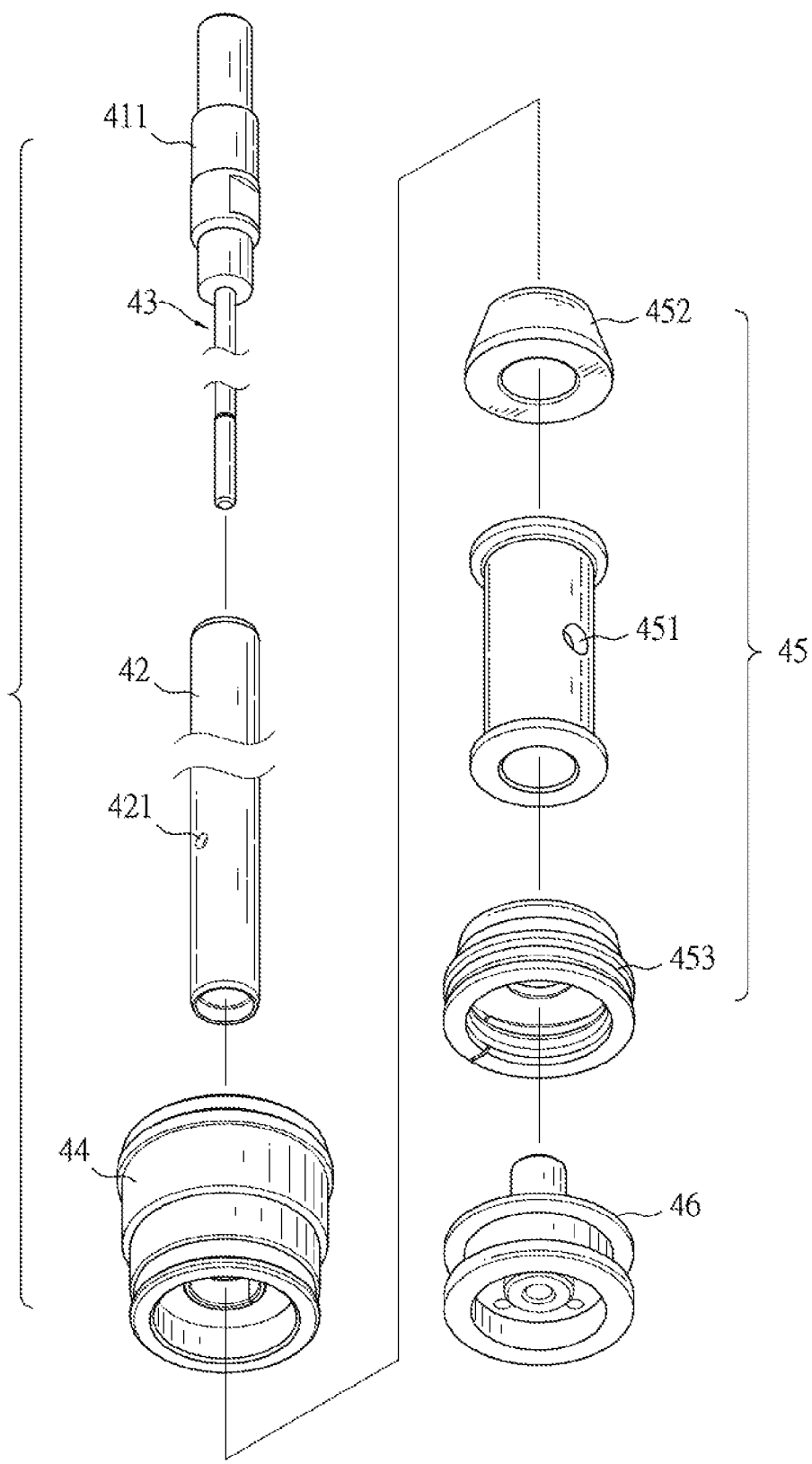
FIG. 7 is another exploded top view of the pressure-balanced shock absorber in accordance with the present invention.

With reference to FIGS. 2, 3, and 7, the piston tube 42 is a hollow tube and is mounted around an end of the valve tube 411, and an inner space of the piston tube 42 communicates with the valve passage 4111 of the valve tube 411 and has at least one inflating hole 421 formed through the piston tube 42. In the preferred embodiment, the number of the at least one inflating hole 421 is two.

The valve adjusting rod 43 is movably mounted in the valve passage 4111 of the inflatable base 41 and the piston tube 42, and a top end of the valve adjusting rod 43 abuts a bottom end of the first shift bar 416 of the first valve core.

The positioning base 45 is mounted around the piston tube 42 and has at least one inlet 451 formed through the positioning base 45, and the at least one inlet 451 aligns with the at least one inflating hole 421 of the piston tube 42. In the preferred embodiment, the number of the at least one inlet 451 is two.

The piston base 46 is connected to the piston tube 42 and has a piston passage 463 and a second valve core. The piston passage 463 is formed in the piston base 46 and communicates with the inner space of the piston tube 42. A second stepped surface 465 is formed and extending in the piston passage 463. The second valve core is mounted in the piston base 46 and selectively seals the piston passage 463 of the piston base 46.

In the preferred embodiment, the second valve core has a second fixing base 461, a second shift bar 462, and a second resilient element 464. The second fixing base 461 is securely mounted in an inner surface of the piston base 46 and has a second inflating passage 4611 formed through the second fixing base 461. The second shift bar 462 is movably mounted in the second inflating passage 4611 of the second fixing base 461 and selectively abuts a bottom end of the valve adjusting rod 43. The second shift bar 462 has a second annular flange 4621 formed around and on the second shift bar 462. The second resilient element 464 is mounted around the second shift bar 462 and is disposed between the second shift bar 462 and the second fixing base 461 to push upwards the second shift bar 462 and to make the second annular flange 4621 abut the second stepped surface 465 of the piston base 46 to seal the second inflating passage 4611 of the second fixing base 414.

The inner tube 47 is mounted around the piston tube 42 and disposed in the outer tube 30. The piston base 46 abuts an inner surface of the inner tube 47 to divide the inner space of the inner tube 47 into a first air chamber 471 and a second air chamber 472. The first air chamber 471 is formed between the inner tube 47 and the piston tube 42. The first air chamber 471 communicates with the at least one inlet 451 and the at least one inflating hole 421. The first air chamber 471 communicates with the second air chamber 472 via the second inflating passage 4611 of the second fixing base 461 and the piston passage 463.

The inner base 44 is mounted around the piston tube 42 and seals a top opening of the inner tube 47. Two ends of the positioning base 45 respectively abut the inner base 44 and the piston base 46 to achieve the positioning effect. The positioning base 45 has an upper cushion 452 and a lower cushion 453. The upper cushion 452 and the lower cushion 453 are mounted around the piston tube 42 at a spaced interval with each other, and the upper cushion 452 and the lower cushion 453 respectively abut the inner base 44 and the piston base 46.

The adjusting resilient element 48 is disposed in the piston tube 42 and is mounted around the valve adjusting rod 43. The valve adjusting rod 43 has a C-shaped ring 431, the C-shaped ring 431 is mounted on an outer surface of the valve adjusting rod 43 near the piston base 46, and two ends of the adjusting resilient element 48 respectively abut the C-shaped ring 431 and the piston base 46. The adjusting resilient element 48 pushes the valve adjusting rod 43 towards the inflatable base 41 to the original position. The top end of the valve adjusting rod 43 pushes the first shift bar 416 of the first valve core upwards, and the bottom end of the valve adjusting rod 43 separates from the second shift bar 462 of the second valve core to make the second resilient element 464 push up the second shift bar 462. In the preferred embodiment, the adjusting resilient element 48 is a compression spring.

With reference to FIGS. 2 to 5, when the present invention is in use, an inflator is connected to the inflatable base 41, and the inflator presses the first shift bar 416 of the first valve core to push the valve adjusting rod 43 downward. The first resilient element 417 is pressed by the first shift bar 416 to make the first valve core unseal the first inflating passage 4141 and the C-shaped ring 431 of the valve adjusting rod 43 presses the adjusting resilient element 48. The bottom end of the valve adjusting rod 43 pushes the second shift bar 462 of the second valve core downward. The second resilient element 464 is pressed by the second shift bar 462 to unseal the second inflating passage 4611. Gas from the inflator can pass through the first inflating passage 4141 of the first fixing base 414, the valve passage 4111 of the valve tube 411, the at least one inflating hole 421 of the piston tube 42, and the at least one inlet 451 of the positioning base 45 to fill in the first air chamber 471, and at the same time the gas passes through the second inflating passage 4611 of the second fixing base 461 and the piston passage 463 of the piston base 46 to fill in the second chamber 472. After the inflating process is finished, the inflator is detached and the adjusting resilient element 48 pushes the valve adjusting rod 43 to the original position. The first resilient element 417 and the second resilient element 464 respectively push upwards the first shift bar 416 and the second shift bar 462 to seal the first inflating passage 4141 and the second inflating passage 4611. The present invention achieves the effect of inflating the two air chambers at the same time by the movement of the valve adjusting rod 43 to simplify the inflating steps and promote the inflating efficiency.

In another preferred embodiment, the present invention does not have the adjusting resilient element 48, and the first shift bar 416 and the second shift bar 462 are respectively pushed by the first resilient element 417 and the second resilient element 462 to seal the first inflating passage 4141 and the second inflating passage 4611, or the first valve core and the second valve core do not have the first resilient element 417 and the second resilient element 464, and two ends of the valve adjusting rod 43 are respectively connected to the first shift bar 416 and the second shift bar 464 to achieve the effect of synchronous movement, and the valve adjusting rod 43 is pushed by the adjusting resilient element 48 and drives the first shift bar 416 and the second shift bar 462 to respectively seal the first inflating passage 4141 and the second inflating passage 4611.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A pressure-balanced shock absorber for a bicycle, the pressure-balanced shock absorber comprising:
   an outer tube;
   an inflatable base disposed in the outer tube and having
      a valve passage formed in the inflatable base; and
      a first valve core mounted in the inflatable base and selectively sealing the valve passage;
   a piston tube connected to and communicating with the valve passage and having
      at least one inflating hole formed through the piston tube;
   a valve adjusting rod movably mounted in the valve passage of the inflatable base and the piston tube;
   a piston base connected to the piston tube and having
      a piston passage formed in the piston base and communicating with the piston tube; and
      a second valve core mounted in the piston base and selectively sealing the piston passage; and
   an inner tube mounted around the piston tube and disposed in the outer tube, the piston base abutting an inner surface of the inner tube to divide the inner space of the inner tube into
      a first air chamber disposed between the inner tube and the piston tube, and communicating with the at least one inflating hole; and
      a second chamber communicating with the first air chamber via the piston passage;
   wherein when the first valve core of the inflatable base is not pressed, the first valve core and the second valve core respectively seal the valve passage and the piston passage;
   wherein when the first valve core is pressed, the first valve core pushes the valve adjusting rod to press the second valve core to make the first valve core unseal the valve passage, and to make the second valve core unseal the piston passage, thereby making the valve passage, the first air chamber, and the piston passage communicate with each other.

2. The pressure-balanced shock absorber as claimed in claim 1, wherein
   the first valve core has
      a first fixing base securely mounted in the valve tube and having
         a first inflating passage formed through the first fixing base;
      a first shift bar movably mounted in the first inflating passage; and
      a first resilient element mounted around the first shift bar and disposed between the first shift bar and the first fixing base to push upwards the first shift bar and to seal the first inflating passage;
   the second valve core has
      a second fixing base securely mounted in an inner surface of the piston base and having
         a second inflating passage formed through the second fixing base;
      a second shift bar movably mounted in the second inflating passage; and
      a second resilient element mounted around the second shift bar and disposed between the second shift bar and the second fixing base to push upwards the second shift bar and to seal the second inflating passage;
   wherein the pressure-balanced shock absorber further has an adjusting resilient element, the adjusting resilient element is disposed in the piston tube and is mounted around the valve adjusting rod, the adjusting resilient element pushes the valve adjusting rod towards the inflatable base, a top end of the valve adjusting rod pushes up the first shift bar of the first valve core and a bottom end of the valve adjusting rod separates from the second shift bar of the second valve core;
   wherein when the first shift bar of the first valve core is pressed, the first shift bar pushes the valve adjusting rod to press the second shift bar of the second valve core to make the first valve core unseal the valve passage, and to make the second valve core unseal the piston passage.

3. The pressure-balanced shock absorber as claimed in claim 2, wherein the bottom end of the valve adjusting rod selectively abuts the second shift bar.

4. The pressure-balanced shock absorber as claimed in claim 3, wherein the valve adjusting rod has a C-shaped ring, the C-shaped ring is mounted on an outer surface of the valve adjusting rod, and two ends of the adjusting resilient element respectively abut the C-shaped ring and the piston base.

5. The pressure-balanced shock absorber as claimed in claim 4, wherein the inflatable base has a valve tube, and the valve tube is mounted in the inflatable base, the valve passage is formed in the valve tube, and the piston tube is mounted around on the valve tube.

6. The pressure-balanced shock absorber as claimed in claim 5, wherein the pressure-balanced shock absorber further has a valve cover detachably covered on the inflatable base.

7. The pressure-balanced shock absorber as claimed in claim 6, wherein the pressure-balanced shock absorber further has an inner base, the inner tube has a top opening, and the inner base is mounted around the piston tube and seals the top opening of the inner tube.

8. The pressure-balanced shock absorber as claimed in claim 7, wherein the pressure-balanced shock absorber further has a positioning base, and the positioning base is mounted around the piston tube and has at least one inlet formed through the positioning base and aligning with the at least one inflating hole of the piston tube;

an upper cushion abutting the inner base; and a lower cushion abutting the piston base.

9. The pressure-balanced shock absorber as claimed in claim 1, wherein the inflatable base has a valve tube, and the valve tube is mounted in the inflatable base, the valve passage is formed in the valve tube, and the piston tube is mounted around on the valve tube.

10. The pressure-balanced shock absorber as claimed in claim 9 further comprising a valve cover detachably covered on the inflatable base.

11. The pressure-balanced shock absorber as claimed in claim 1, wherein the pressure-balanced shock absorber further has an inner base, the inner tube has a top opening, and the inner base is mounted around the piston tube and seals the top opening of the inner tube.

12. The pressure-balanced shock absorber as claimed in claim 11, wherein the pressure-balanced shock absorber further has a positioning base, and the positioning base is mounted around the piston tube and has at least one inlet formed through the positioning base and aligning with the at least one inflating hole of the piston tube;

an upper cushion abutting the inner base; and a lower cushion abutting the piston base.

13. The pressure-balanced shock absorber as claimed in claim 1, wherein the first valve core has a first fixing base securely mounted in the valve tube and having a first inflating passage formed through the first fixing base;

a first shift bar movably mounted in the first inflating passage; and a first resilient element mounted around the first shift bar and disposed between the first shift bar and the first fixing base to push upward the first shift bar to seal the first inflating passage;

the second valve core has a second fixing base securely mounted in an inner surface of the piston base and having a second inflating passage formed through the second fixing base;

a second shift bar movably mounted in the second inflating passage; and a second resilient element mounted around the second shift bar and disposed between the second shift bar and the second fixing base to push upwards the second shift bar and to seal the second inflating passage;

wherein when the first shift bar of the first valve core is pressed, the first shift bar pushes the valve adjusting rod to press the second shift bar of the second valve core to make the first valve core unseal the valve passage, and to make the second valve core unseal the piston passage.

14. The pressure-balanced shock absorber as claimed in claim 1 further comprising:

an adjusting resilient element disposed in the piston tube, mounted around the valve adjusting rod, and pushing upward the valve adjusting rod to drive the first valve core and the second valve core to make the first valve core unseal the valve passage, and to make the second valve core unseal the piston passage.

15. The pressure-balanced shock absorber as claimed in claim 1, wherein the valve adjusting rod has a C-shaped ring, the C-shaped ring is securely mounted around the valve adjusting rod, and two ends of the adjusting resilient element respectively abut the C-shaped ring and the piston base.

* * * * *